United States Patent
Seo et al.

(10) Patent No.: US 10,941,467 B2
(45) Date of Patent: Mar. 9, 2021

(54) COLD-ROLLED STEEL SHEET WITH EXCELLENT FORMABILITY, GALVANIZED STEEL SHEET, AND MANUFACTURING METHOD THEREOF

(71) Applicant: POSCO, Pohang-si (KR)

(72) Inventors: Chang Hyo Seo, Gwangyang-si (KR); Yeon Sang Ahn, Gwangyang-si (KR); Joo Hyun Ryu, Gwangyang-si (KR); Kyoo Young Lee, Gwangyang-si (KR); Won Pyo Hong, Gwangyang-si (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 16/520,935

(22) Filed: Jul. 24, 2019

(65) Prior Publication Data

US 2020/0190640 A1 Jun. 18, 2020

(30) Foreign Application Priority Data

Dec. 18, 2018 (KR) .................. 10-2018-0164379

(51) Int. Cl.
*C22C 38/04* (2006.01)
*C22C 38/02* (2006.01)
(Continued)

(52) U.S. Cl.
CPC ............ *C22C 38/04* (2013.01); *C21D 8/0236* (2013.01); *C22C 38/02* (2013.01); *C22C 38/22* (2013.01);
(Continued)

(58) Field of Classification Search
CPC .................................................... C22C 38/04
See application file for complete search history.

(56) References Cited

U.S. PATENT DOCUMENTS 9,028,973 B2  5/2015  Takahashi et al.
9,139,885 B2  9/2015  Kawata et al.
(Continued)

FOREIGN PATENT DOCUMENTS

JP   2005264176   9/2005
JP   2010090432   4/2010
(Continued)

OTHER PUBLICATIONS

English machine translation of JP 2015078395 A of Azuma published Apr. 23, 2015 (Year: 2015).*

(Continued)

*Primary Examiner* — Jophy S. Koshy
(74) *Attorney, Agent, or Firm* — Cantor Colburn LLP

(57) ABSTRACT

Provided is a cold-rolled steel sheet, a galvanized steel sheet and a galvannealed steel sheet, comprising, by wt %, 0.06-0.15% of C, 1.2% or less (excluding 0%) of Si, 1.7-2.7% of Mn, 0.15% or less (excluding 0%) of Mo, 1.0% or less (excluding 0%) of Cr, 0.1% or less (excluding 0%) of P, 0.01% or less (excluding 0%) of S, 0.001-0.04% of Ti, 0.001-0.04% of Nb, 0.01% or less (excluding 0%) of N, 0.01% or less (excluding 0%) of B, and a remainder of Fe and unavoidable impurities, wherein the Si, C, Mn, Mo and Cr contents satisfy Relationship 1, and wherein a microstructure comprising, in area %, 10-70% of ferrite, 10-50% of the sum of bainite and retained austenite, and a remainder of fresh martensite, wherein a ratio (Mb/Mt) is 60% or more, and methods of manufacturing these steel sheets.

$([Si]+[C]\times 3)/([Mn]+[Mo]+[Cr])\geq 0.18.$  [Relationship 1]

13 Claims, 2 Drawing Sheets

(51) Int. Cl.
*C21D 8/02* (2006.01)
*C23C 2/40* (2006.01)
*C22C 38/22* (2006.01)
*C22C 38/26* (2006.01)
*C22C 38/28* (2006.01)
*C22C 38/38* (2006.01)

(52) U.S. Cl.
CPC .............. *C22C 38/26* (2013.01); *C22C 38/28* (2013.01); *C22C 38/38* (2013.01); *C23C 2/40* (2013.01); *C21D 2211/002* (2013.01); *C21D 2211/008* (2013.01)

(56) References Cited

U.S. PATENT DOCUMENTS

| | | | |
|---|---|---|---|
| 2009/0252641 A1* | 10/2009 | Hoshi | ................... C22C 38/02 420/118 |
| 2013/0167980 A1* | 7/2013 | Kawata | ................... C23C 2/02 148/504 |
| 2016/0312326 A1 | 10/2016 | Drillet et al. | |
| 2018/0298462 A1 | 10/2018 | Sano et al. | |
| 2019/0368002 A1 | 12/2019 | Hayashi et al. | |
| 2020/0071802 A1 | 3/2020 | Hirashima et al. | |
| 2020/0087762 A1 | 3/2020 | Ahn et al. | |

FOREIGN PATENT DOCUMENTS

| | | | | |
|---|---|---|---|---|
| JP | 2012117148 | | 6/2012 | |
| JP | 2015078395 | | 4/2015 | |
| JP | 6384703 | | 9/2018 | |
| JP | 6418363 | | 11/2018 | |
| KR | 20130032917 | | 4/2013 | |
| KR | 20150073844 | | 7/2015 | |
| KR | 1020160096611 | | 8/2016 | |
| KR | 20180070895 | | 6/2018 | |
| KR | 20190076307 | | 7/2019 | |
| WO | WO-2012036269 | A1 * | 3/2012 | ........... C22C 38/005 |
| WO | 2018131722 | | 7/2018 | |
| WO | WO-2019124693 | A1 * | 6/2019 | ............. C22C 38/22 |

OTHER PUBLICATIONS

English machine translation of WO 2019/124693 A1 of Choi published on Jun. 27, 2019 (Year: 2019).*
Korean Office Action—Korean Application No. 10-2018-0164379 dated Apr. 1, 2020, citing JP 2012-117148 and KR 10-2019-0076307.
International Search Report—PCT/KR2019/017858 dated Mar. 24, 2020.

* cited by examiner

COLD-ROLLED STEEL SHEET WITH EXCELLENT FORMABILITY, GALVANIZED STEEL SHEET, AND MANUFACTURING METHOD THEREOF

BACKGROUND

1. Field of the Invention

The present disclosure relates to high-strength cold-rolled steel sheet and galvanized steel sheet, having a tensile strength of 980 MPa or more and which is mainly used for automotive structural members, and a method of manufacturing the same.

2. Discussion of Related Art

Recently, as an automotive steel sheet, steel sheets having higher strength have been required in order to improve fuel efficiency or increase durability following various environmental regulations and energy use regulations, and the use of a high-strength steel sheet having a tensile strength of 980 MPa or more as a material for an automotive structure or an reinforcing material is increasing for collision safety and passenger protection. Particularly, in recent years, as regulations governing the impact stability of automobiles have increased, to improve the impact resistance of car bodies, high-strength steels with excellent yield strength are applied for a structural part such as a member, a seat rail or a pillar.

Generally, to strengthen steel, solid-solution strengthening, precipitation strengthening, strengthening by grain refinement, transformation strengthening and the like have been used. However, among these methods, the solid-solution strengthening and the grain refinement strengthening have a disadvantage in that there is much difficulty in manufacturing a high strength steel having a tensile strength of 590 MPa or more.

A precipitation-hardened, high-strength steel is manufactured by a technique of strengthening a steel sheet through precipitation of a carbonitride by adding a carbonitride-forming element such as copper (Cu), niobium (Nb), titanium (Ti) or vanadium (V), or ensuring strength through grain refinement by inhibiting grain growth using a fine precipitate. The technique has an advantage of easily obtaining high strength at low production costs, but since a fine precipitate causes a rapid increase in a recrystallization temperature, the technique has a disadvantage in the necessity for high-temperature annealing to ensure ductility with sufficient recrystallization. In addition, there is a problem in that it is difficult to obtain 600 MPa or more in a high-strength steel with the precipitation-hardened steel which is strengthened by precipitating a carbonitride in a ferrite matrix.

In addition, various types of transformation-strengthened high-strength steels, such as a ferrite-martensite dual-phase steel which includes hard martensite in the ferrite matrix, transformation-induced plasticity (TRIP) steel manufactured using transformation-induced plasticity of retained austenite or a complex-phase (CP) steel having a structure consisting of ferrite and hard bainite or martensite have been developed.

However, generally, as the strength of the steel sheet increases, elongation decreases, and thus, formability is degraded. Therefore, strength gradually increases, and cracks and wrinkles are generated in the process of press forming of automobile parts, which makes it difficult to produce a complicated part.

The prior art of improving formability of the high-tension steel sheet is disclosed in Patent Document 1. Patent Document 1 suggests a method of manufacturing a high-strength steel sheet by dispersing fine precipitated copper particles with a particle size of 1 to 100 nm in the structure to enhance formability as a steel sheet consisting of a composite structure containing martensite as a main material. However, the art disclosed in Patent Document 1 has problems of generating hot shortness caused by copper (Cu) by adding copper (Cu) in an excessively high content of 2 to 5% to precipitate preferable fine copper (Cu) particles, and excessively increased production costs.

Meanwhile, Patent Document 2 suggests a precipitation-hardened steel sheet having a microstructure having ferrite as a matrix and 2 to 10 area % of pearlite, and is improved in strength through precipitation strengthening caused by the addition of a carbonitride-forming element such as niobium (Nb), titanium (Ti) or vanadium (V), and grain refinement. However, the precipitation-hardened steel sheet disclosed in Patent Document 2 has good hole expandability but has a limitation in increasing tensile strength, and due to having high yield strength, and low ductility, there is a problem of cracking occurring in press forming.

In addition, Patent Document 3 suggests a method of manufacturing a cold-rolled steel sheet which is able to achieve both high strength and high ductility using tempered martensite and also obtaining an excellent sheet shape after continuous annealing. However, the cold-rolled steel sheet of Patent Document 3 has a high content, such as 0.2% or more, of carbon, and thus, a problem of a furnace dent caused by a large amount of silicon (Si) and the deterioration of weldability, may be generated.

PRIOR ART DOCUMENTS

Patent Documents (Patent Document 1) Japanese Patent Publication Laid-open No. 2005-264176
(Patent Document 2) Korean Patent Publication No. 2015-0073844
(Patent Document 3) Japanese Patent Publication Laid-open No. 2010-090432

SUMMARY OF INVENTION

The present disclosure is directed to providing a cold-rolled steel sheet and a galvanized steel sheet, which have high strength and excellent formability, and methods of manufacturing the same.

The object of the present disclosure is not limited to the above description. There will be no difficulty for those of ordinary skill in the art in understanding additional objects of the present disclosure from the overall aspects of the specification.

In one aspect, the present disclosure provides a cold-rolled steel sheet with excellent formability, comprising, by weight percent (wt %), 0.06 to 0.15% of carbon (C), 1.2% or less (excluding 0%) of silicon (Si), 1.7 to 2.7% of manganese (Mn), 0.15% or less (excluding 0%) of molybdenum (Mo), 1.0% or less (excluding 0%) of chromium (Cr), 0.1% or less of phosphorus (P), 0.01% or less of sulfur (S), 0.001 to 0.04% of titanium (Ti), 0.001 to 0.04% of niobium (Nb), 0.01% or less of nitrogen (N), 0.01% or less (excluding 0%) of boron (B), and a remainder of Fe and unavoidable impurities, wherein the silicon (Si), carbon (C), manganese (Mn), molybdenum (Mo) and chromium (Cr)

contents in the matrix at the position of (¼) thickness satisfy the following Relationship 1, and wherein a microstructure comprising, in area percent (area %), 10 to 70% of ferrite, 10 to 50% of the sum of bainite and retained austenite, and a remainder of fresh martensite, in which a ratio (Mb/Mt) of the fraction of fresh martensite (Mb) adjacent to bainite to the fraction of total fresh martensite (Mt) is 60% or more.

$$([Si]+[C] \times 3)/([Mn]+[Mo]+[Cr]) \geq 0.18 \qquad \text{[Relationship 1]}$$

(where [Si], [C], [Mn], [Mo] and [Cr] indicate wt % of silicon (Si), carbon (C), manganese (Mn), molybdenum (Mo), chromium (Cr) detected in the position of (¼) thickness of the cold-rolled steel sheet, respectively)

The cold-rolled steel sheet may further include, by wt %, 1.0% or less (excluding 0%) of aluminum (sol. Al) and 0.05% or less (excluding 0%) of antimony (Sb).

The cold-rolled steel sheet may have a ratio (Ms/Mt) of the fraction of fine fresh martensite (Ms) having an average particle size of 3 μm or less to the fraction of total fresh martensite (Mt) of 60% or more.

In the cold-rolled steel sheet, each of a strain hardening coefficient (n), elongation (El), tensile strength (TS), and a yield ratio (YR), measured at a strain of 4 to 6%, may satisfy the following Relationship 2.

$$n \times El \times TS/YR \geq 2500 \qquad \text{[Relationship 2]}$$

(where n, El, TS, and YR indicate the strain hardening coefficient (n), elongation (El), tensile strength (TS), and yield ratio (YR), which are measured at a strain of 4 to 6%, respectively).

In another aspect, the present disclosure provides a galvanized steel sheet manufactured by forming a galvanized layer on the surface of the cold-rolled steel sheet.

In still another aspect, the present disclosure provides a galvannealed steel sheet manufactured by forming a galvannealed layer on the surface of the cold-rolled steel sheet.

In yet another aspect, the present disclosure provides a method of manufacturing a cold-rolled steel sheet with excellent formability, comprising: reheating a steel slab, comprising, by wt %, 0.06 to 0.15% of carbon (C), 1.2% or less (excluding 0%) of silicon (Si), 1.7 to 2.7% of manganese (Mn), 0.15% or less (excluding 0%) of molybdenum (Mo), 1.0% or less (excluding 0%) of chromium (Cr), 0.1% or less of phosphorus (P), 0.01% or less of sulfur (S), 0.001 to 0.04% of titanium (Ti), 0.001 to 0.04% of niobium (Nb), 0.01% or less of nitrogen (N), 0.01% or less (excluding 0%) of boron (B), and the remainder including iron (Fe) and unavoidable impurities, and hot rolling the steel slab such that the temperature at a finishing mill exit reaches Ar3 to Ar3+50° C.; obtaining a hot-rolled steel sheet by coiling the steel slab at 400 to 700° C. after the hot-rolling and cooling the coiled steel sheet from the coiling temperature to room temperature at an average cooling rate of 0.1° C./s or less; obtaining a cold-rolled steel sheet by cold rolling the coiled hot-rolled steel sheet at a reduction ratio of 40 to 70%; continuous annealing the cold-rolled steel sheet at an annealing temperature ranging from Ac1+20° C. to Ac3−20° C.; primary cooling the annealed cold-rolled steel sheet from the annealing temperature to a primary finish cooling temperature of 630 to 670° C. at an average cooling rate of 10° C./s or less; secondary cooling the primary cooled cold-rolled steel sheet from the primary finish cooling temperature to a secondary finish cooling temperature of 400 to 500° C. at an average cooling rate of 5° C./s or more using quenching equipment; maintaining the cooled cold-rolled steel sheet at the secondary finish cooling temperature for 70 seconds or more after the secondary cooling; and tertiary cooling from the maintaining temperature to (Ms−100° C.) or less at an average cooling rate of 5° C./s or more after the maintaining.

The steel slab may further include, by wt %, 1.0% or less (excluding 0%) of aluminum (sol. Al), and 0.05% or less (excluding 0%) of antimony (Sb).

The continuous annealing may be performed in a temperature range from 760 to 820° C.

The method may further include performing skin-pass rolling at a reduction ratio of less than 1% after the tertiary cooling.

In yet another aspect, a method of manufacturing a galvanized steel sheet with excellent formability, the same as the above-described method of manufacturing a cold-rolled steel sheet with excellent formability, and further includes performing galvanizing in a temperature range from 430 to 490° C. before the tertiary cooling after the maintaining, is provided.

The method may further includes performing galvannealing before the tertiary cooling after galvanizing, is provided.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
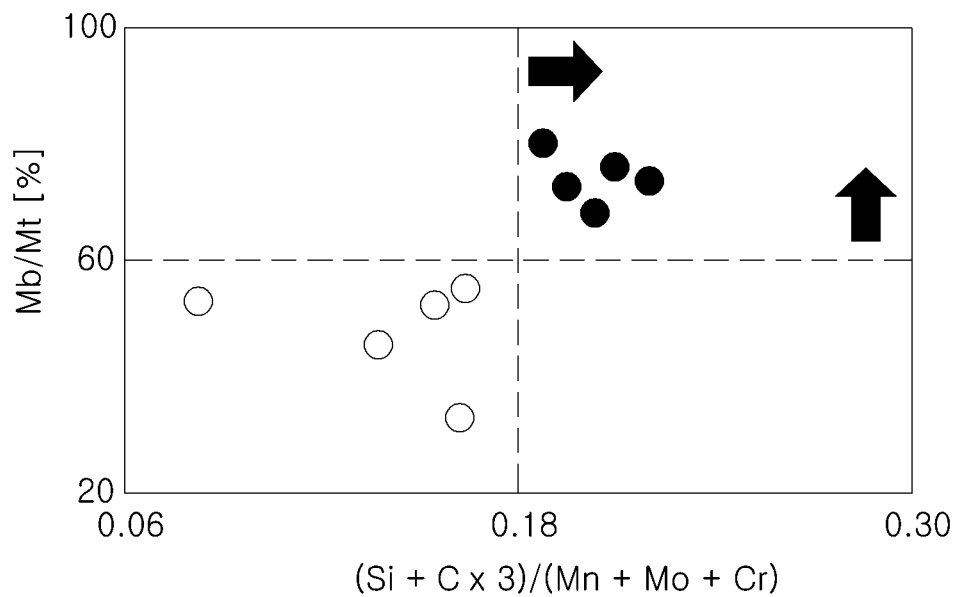
FIG. 1 shows the change in the occupation ratio (Mb/Mt) of fresh martensite adjacent to bainite to total fresh martensite according to Relationship 1 ((Si+C×3)/(Mn+Mo+Cr))

The terminology used herein is for only describing particular embodiments, and is not intended to limit the present invention. The singular forms as used herein include plural forms unless clearly indicated otherwise.

The terms "include," "have," "including" or "having" used herein specify specific characteristics, regions, integers, steps, actions, factors and/or components, and it should be understood that the possibility of the presence or addition of other characteristics, regions, integers, steps, actions, factors, components and/or groups is not excluded in advance.

Unless defined otherwise, all terms including technical and scientific terms used herein have the same meaning as commonly understood by those of ordinary skill in the art to which the present invention belongs. The pre-defined terms commonly used are further construed to have meanings consistent with the related technical literature and the present invention, and unless defined, are not interpreted in an ideal or very formal sense.

As one aspect for improving the formability of a high strength steel, the inventors have noted that if the high-strength steel have a low yield ratio (YR) like the characteristics of a dual-phase (DP) steel most widely used among transformation strengthened high-strength steels, and also have higher elongation (El) and a higher strain hardening coefficient (n) than the DP steel, the application of high-strength steels to complicated parts may be expanded by preventing processing defects such as cracks or wrinkles generated in press forming.

As a result of further study, the inventors found that, when a small amount of bainite was introduced into the final microstructure of a cold-rolled steel sheet or galvanized steel sheet, and fresh martensite was formed adjacent to the bainite, the fresh martensite was able to be uniformly dispersed and become greatly finer, thereby effectively dispersing strain at the beginning of forming and greatly improving a work hardening rate. In addition, the inventors had confirmed through experiments that, due to the above-described microstructure, local stress concentration is relieved, and the nucleation, growth and cohesion of voids are delayed, thereby greatly improving elongation. Thus, based on the experimental result, the present invention was completed.

Hereinafter, a cold-rolled steel sheet, a galvanized steel sheet and a galvannealed steel sheet, which have excellent formability, according to an aspect of the present invention will be described in detail. In the present invention, it should be noted that the content of each element is expressed by wt % unless specifically defined otherwise. In addition, the ratios of crystals or microstructures are expressed based on area unless specifically defined otherwise.

First, the component system of a cold-rolled steel sheet with excellent formability according to an aspect of the present invention will be described. The cold-rolled steel sheet according to an aspect of the present invention comprises, by weight percent (wt %), 0.06 to 0.15% of carbon (C), 1.2% or less (excluding 0%) of silicon (Si), 1.7 to 2.7% of manganese (Mn), 0.15% or less (excluding 0%) of molybdenum (Mo), 1.0% or less (excluding 0%) of chromium (Cr), 0.1% or less (excluding 0%) of phosphorus (P), 0.01% or less (excluding 0%) of sulfur (S), 0.001 to 0.04% of titanium (Ti), 0.001 to 0.04% of niobium (Nb), 0.01% or less (excluding 0%) of nitrogen (N), 0.01% or less (excluding 0%) of boron (B), and a remainder of Fe and unavoidable impurities.

Carbon (C): 0.06 to 0.15%

Carbon (C) in steel is a very important element added to strengthen a transformed structure. Carbon (C) facilitates achievement of high strength and promotes the formation of martensite in a complex-phase steel. When the carbon (C) content increases, the martensite content in the steel increases. However, when the carbon (C) content is more than 0.15%, the strength of martensite increases, but the strength difference between the martensite and ferrite, having a lower carbon content, is increased. Due to such strength difference, a fracture may easily occur at the interface between phases during the application of stress, and thus elongation and a work hardening rate are lowered. In addition, due to deterioration of weldability, welding defects may be generated in the processing of a part. On the other hand, when the carbon (C) content is lowered to less than 0.06%, it may be very difficult to ensure a desired strength. For this reason, the carbon (C) content in the present invention is preferably limited to 0.06 to 0.15%, and more preferably, limited to 0.06 to 0.12%.

Silicon (Si): 1.2% or Less (Excluding 0%)

The silicon (Si) is a ferrite-stabilizing element, which contributes to the formation of martensite by promoting ferrite transformation and facilitating carbon (C) concentration in untransformed austenite. In addition, due to a high solid-solution strengthening ability, the silicon (Si) is a useful element which is effective in increasing the strength of ferrite and reducing a phase hardness difference, and is able to ensure strength without deteriorating the ductility of a steel sheet. However, when the silicon (Si) content is more than 1.2%, surface scale defects may be caused, thereby lowering the quality of a plating surface and lowering phosphatability. Therefore, in the present invention, the silicon (Si) content is preferably limited to 1.2% or less (excluding 0%), and more preferably, limited to 1.0% or less (excluding 0%).

Manganese (Mn): 1.7 to 2.7%

Manganese (Mn) is an element which reduces a particle size without impairing ductility, prevents hot shortness caused by FeS production by completely precipitating sulfur in steel into MnS, and strengthening the steel. In addition, Mn serves to lower a critical cooling rate at which a martensite phase is obtained in a complex-phase steel, and thus martensite can be more easily formed. To obtain the above-described effects and ensure a desired strength according to the present invention, it is preferable that the Mn content is 1.7% or more. On the other hand, when the manganese (Mn) content is more than 2.7%, there is a high possibility of problems in weldability and hot-rolling ability, and due to the formation of excessive martensite, the property is unstable, and due to the formation of the manganese (Mn)-band of an Mn oxide in the microstructure, there are high risks of process cracking and strip breakage. In addition, the Mn oxide is eluted on the surface during annealing and thus the plating property is greatly lowered. For this reason, in the present invention, the manganese (Mn) content is preferably limited to 1.7 to 2.7%, and more preferably, limited to 1.8 to 2.5%.

Molybdenum (Mo): 0.15% or Less (Excluding 0%)

Molybdenum (Mo) is an element which is added to delay transformation of austenite to pearlite and improve ferrite refinement and strength. Such Mo improves the hardenability of steel to finely form martensite at a grain boundary, thereby enabling control of a yield ratio. However, since molybdenum (Mo) is an expensive element, when the Mo content increases, the more disadvantageous it becomes in a manufacturing process. Therefore, it is preferable to suitably control the molybdenum (Mo) content. To obtain the above-described effects, it is preferable to add Mo at a maximum of 0.15%, and when the Mo content is more than 0.15%, it leads to a drastic increase in alloy production costs, thereby lowering economic feasibility, and steel ductility is deteriorated due to an excessive grain refinement effect and a solid-solution strengthening effect. For this reason, in the present invention, the Mo content is preferably limited to 0.15% or less (excluding 0%).

Chromium (Cr): 1.0% or Less (Excluding 0%)

Chromium (Cr) is an element which is added to improve the hardenability of steel, and ensure high strength, and is an element playing a very important role in forming martensite and minimizing a decrease in elongation versus an increase in strength, which is advantageous in manufacturing a complex-phase steel with high ductility. Particularly, chromium (Cr) is the element which forms, in a hot-rolling process, a chromium (Cr)-based carbide such as $Cr_{23}C_6$, which is partially dissolved in an annealing process and partially remains without being dissolved, and makes it possible to control a solid-solution carbon (C) amount in martensite after cooling to a suitable level or less, thereby inhibiting yield point elongation (YP-El) and providing an advantage in manufacturing a complex-phase steel with a low yield ratio. However, when the chromium (Cr) content is more than 1.0%, the above-described effects are saturated, and due to an excessive increase in hot-rolling strength, a cold-rolling property is deteriorated. In addition, as the chromium (Cr)-based carbide is increased in fraction and coarsened, a martensite size after annealing is also coarsened, resulting in lower elongation. For this reason, the chromium (Cr) content is preferably limited to 1.0% or less.

Phosphorus (P): 0.1% or Less

Phosphorus (P) in steel is a substitutional element with the highest solid-solution strengthening effect, improves in-plane anisotropy, and is most advantageous for ensuring strength without greatly sacrificing formability. However, when being excessively added, phosphorus (P) highly increases the possibility of brittle fracture, thereby generating the strip breakage of a slab during hot rolling, and serves as an element for hindering a plating surface characteristic. For this reason, in the present invention, the P content is controlled to a maximum of 0.1%.

Sulfur (S): 0.01% or Less

Sulfur (S) is an impurity element which is inevitably added to steel, but lowers ductility and weldability, and therefore, it is important to include sulfur (S) as little as possible. Particularly, since sulfur (S) raises the possibility of hot shortness, its content is preferably controlled to 0.01% or less.

Titanium (Ti): 0.001 to 0.04%, Niobium (Nb): 0.001 to 0.04%

Titanium (Ti) and niobium (Nb) in steel are elements which are effective in increasing the strength of the steel sheet and grain refinement caused by formation of a nano-precipitate. When these elements are added, a very fine nanoprecipitate is formed by being combined with carbon, and the nanoprecipitate serves to strengthen a matrix and thus reduce a phase hardness difference. When each of the titanium (Ti) and niobium (Nb) contents is less than 0.001%, it is difficult to ensure the above-described effect, and when the content is more than 0.04%, due to increased production costs and excessive precipitates, ductility may be greatly lowered. For this reason, in the present invention, each of the titanium (Ti) and niobium (Nb) contents is preferably limited to 0.001 to 0.04%, and more preferably, each of the titanium (Ti) and niobium (Nb) contents may be limited to 0.001 to 0.03%.

Nitrogen (N): 0.01% or Less

Nitrogen (N) is an element effective in stabilizing austenite, but when the content of nitrogen (N) is more than 0.01%, steel refining costs drastically increase. In addition, due to AlN formation and the like, the risk of cracking during continuous casting is greatly increased, and therefore, the upper limit of the nitrogen (N) content is preferably limited to 0.01%.

Boron (B): 0.01% or Less (Excluding 0%)

Boron (B) is an element for delaying austenite-to-pearlite transformation during cooling in annealing, and a hardening element which inhibits ferrite formation and promotes martensite formation. However, when the boron (B) content is more than 0.01%, since excessive boron (B) is concentrated on the surface, resulting in deterioration of plating adhesion, the boron (B) content is controlled to 0.01% or less.

The cold-rolled steel sheet with excellent formability according to an aspect of the present invention may further include 1.0% or less (excluding 0%) of aluminum (sol. Al) and 0.05% or less (excluding 0%) of antimony (Sb), other than the above-described elements.

Aluminum (Sol. Al): 1.0% or Less (Excluding 0%)

Acid-soluble aluminum (sol. Al) is a ferrite-stabilizing element, which is similar to silicon (Si), and added for grain refinement and deoxidation of steel, and is an element effective in improving martensite hardenability by partitioning carbon from ferrite to austenite. In addition, acid-soluble aluminum (sol. Al) is a useful element to improve the ductility of a steel sheet by effectively inhibiting the precipitation of carbide in bainite when maintained in the bainite region. However, when the sol. Al content is more than 1.0%, it is advantageous for increasing the strength due to a grain refinement effect, but due to excessive formation of an inclusion in continuous casting processes, not only the possibility of surface defects on the plated steel sheet may be increased, but also production costs increase. For this reason, in the present invention, the sol. Al content is preferably controlled to 1.0% or less.

Antimony (Sb): 0.05% or Less (Excluding 0%)

Antimony (Sb) is an element which is distributed in a grain boundary and delays diffusion through the grain boundary of an oxidizing element such as manganese (Mn), silicon (Si) or aluminum (Al), and has an excellent effect on inhibition of the surface concentration of an oxide and inhibition of coarsening of the surface concentrate caused by an increased temperature and a change in hot rolling process. However, when the antimony (Sb) content is more than 0.05%, the above-describe effects may be saturated, production costs are increased, and formability is deteriorated. For this reason, the antimony (Sb) content is limited to 0.05% or less.

The remainder excluding the above-described alloy elements is iron (Fe). However, since unintended impurities may be inevitably added from a raw material or the surroundings in a conventional manufacturing process, they may not be excluded. Since these impurities may be known by any ordinary technician, the impurities will not be described in detail.

Meanwhile, in the cold-rolled steel sheet with excellent formability according to an aspect of the present invention, the silicon (Si), carbon (C), manganese (Mn), molybdenum (Mo), chromium (Cr) contents in the matrix at the position of (¼) thickness may satisfy the following Relationship 1.

$$([Si]+[C]\times 3)/([Mn]+[Mo]+[Cr]) \geq 0.18 \quad \text{[Relationship 1]}$$

(where [Si], [C], [Mn], [Mo] and [Cr] indicate wt % of silicon (Si), carbon (C), manganese (Mn), molybdenum (Mo), chromium (Cr) detected in the position of (¼) thickness of the cold-rolled steel sheet, respectively)

To attain the objects of the present invention, that is, to satisfy a low yield ratio, which is a characteristic of a DP steel, and improve a work hardening rate and ductility compared with a conventional DP steel, it is necessary to control a microstructure and a composition, and first, it is important to introduce a small amount of bainite into a microstructure. Such bainite may reduce a phase hardness difference between ferrite and martensite, and a fine nanoscale precipitate may be precipitated into ferrite to further reduce the phase hardness difference.

Silicon (Si) is a ferrite-stabilizing element which contributes to formation of martensite by promoting ferrite transformation and facilitating carbon (C) concentration in untransformed austenite. Carbon (C) is an element also contributing to martensite formation and fraction adjustment through carbon concentration in untransformed austenite. While manganese (Mn), molybdenum (Mo) and chromium (Cr) are elements contributing to improvements of hardenability, they have a relatively low effect of contributing to carbon concentration in austenite compared to silicon (Si) and carbon (C). Therefore, it is important to adjust the proportions of silicon (Si) and carbon (C) well, and other hardening elements manganese (Mn), molybdenum (Mo)

and chromium (Cr), and in the present invention, a suitable ratio of these elements was controlled according to Relationship 1.

In addition, when Relationship 1 regarding silicon (Si), carbon (C), manganese (Mn), molybdenum (Mo) and chromium (Cr) components in a matrix at the position of (¼) thickness is controlled to 0.18 or more, and conditions for hot rolling and annealing processes are optimized, a small amount of bainite can be introduced into the microstructure, and fresh martensite may be formed inside bainite or at the periphery adjacent to bainite. Here, the periphery adjacent to bainite may be defined as a region within 1 μm from the boundary of a bainite phase. As shown in FIG. 1, when the value of Relationship 1 is 0.18 or more, a 60% or more occupation ratio (Mb/Mt, and hereinafter, also referred to as "occupation ratio (Mb/Mt)" or "ratio (Mb/Mt)") of fresh martensite adjacent to bainite in the total fresh martensite in the microstructure may be ensured. In addition, therefore, an occupation ratio (Ms/Mt, and hereinafter, also referred to as "occupation ratio (Ms/Mt)" or "ratio (Ms/Mt)") of fine fresh martensite having an average particle size of 3 μm or less to total fresh martensite may be adjusted to 60% or more.

Meanwhile, in the cold-rolled steel sheet according to an exemplary embodiment of the present invention, the microstructure may comprise, by area %, 10 to 70% of ferrite, 10 to 50% of the total of bainite and retained austenite, and fresh martensite as the remainder. When the ferrite microstructure is less than 10%, it is difficult to ensure elongation, and when the fraction is more than 70%, it is very difficult to ensure sufficient hardness.

In addition, a ratio (Mb/Mt) of the fraction of fresh martensite (Mb) adjacent to bainite to the fraction of total fresh martensite (Mt) may be 60% or more, and the ratio (Ms/Mt) of the fraction of fine fresh martensite (Ms) with an average particle size of 3 μm or less to the fraction of total fresh martensite (Mt) may be 60% or more. Here, the fraction of total fresh martensite (Mt) may be defined as a total fraction of fresh martensite accounting for the microstructure of the steel, and the fraction of fresh martensite (Mb) adjacent to bainite may be defined as the fraction of fresh martensite present in the region within 1 μm from bainite.

Figure 2:
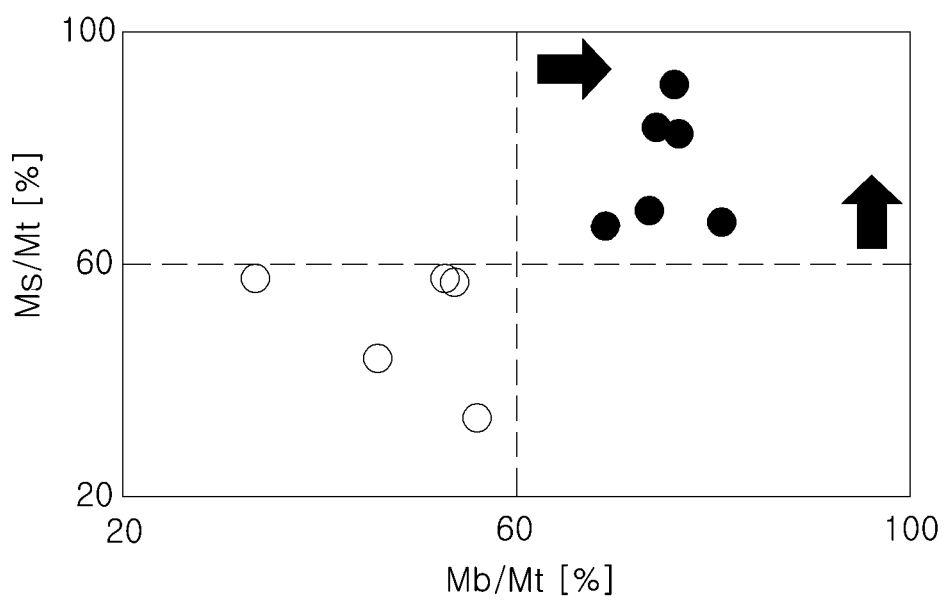
FIG. 2 shows the change in the occupation ratio (Ms/Mt) of fine fresh martensite with an average particle size of 3 μm or less to total fresh martensite according to the occupation ratio (Mb/Mt)

As described above, when Relationship 1 is controlled to 0.18 or more, and conditions for hot rolling and annealing processes are optimized according to the manufacturing process of the present invention, as shown in FIG. 1, a 60% or more occupation ratio (Mb/Mt) of the fresh martensite adjacent to bainite to the total fresh martensite may be ensured. In addition, as shown in FIG. 2, when the occupation ratio (Mb/Mt) is 60% or more, since the fine fresh martensite having an average particle size of 3 μm or less accounts for 60% or more with respect to the total fresh martensite, the phase may be finely and uniformly dispersed, and therefore, formation of a martensite band lowering formability may be inhibited. However, when the occupation ratio (Mb/Mt) is less than 60%, the occupation ratio (Ms/Mt) is lowered to less than 60%. For this reason, accordingly a martensite band structure is formed, an effect of dispersing fine fresh martensite may not be exhibited.

Figure 3:
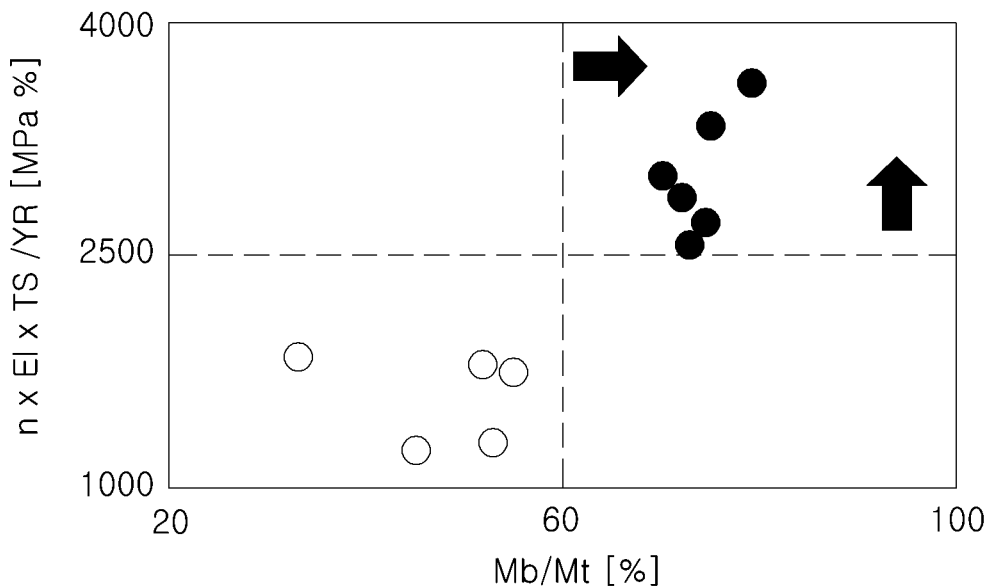
FIG. 3 shows the change in Relationship 2 (n×El×TS/YR) according to the occupation ratio (Mb/Mt)
Figure 4:
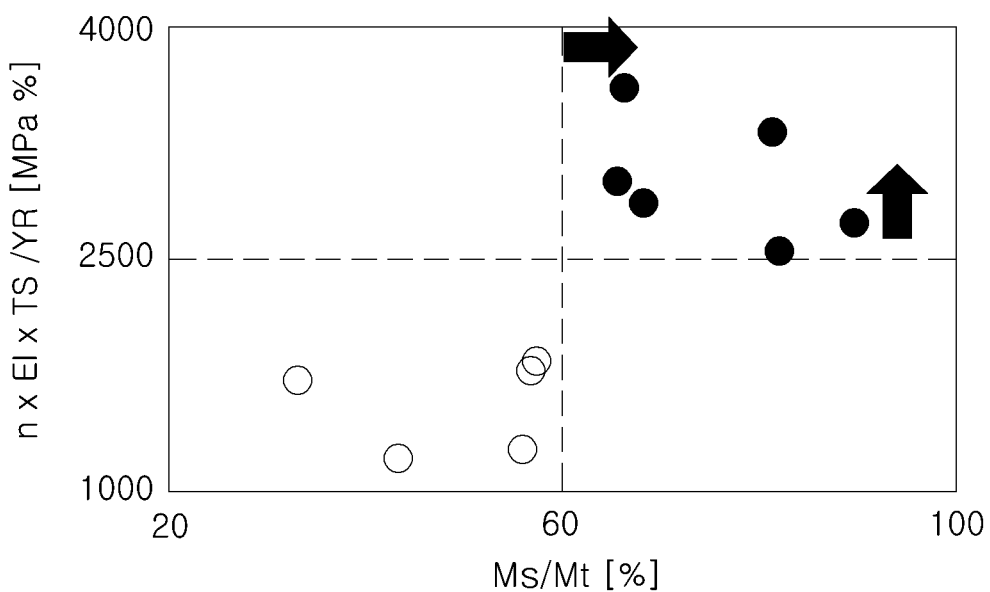
FIG. 4 shows the change in Relationship 2 (n×El×TS/YR) according to the occupation ratio (Ms/Mt).

As described above, in the complex-phase microstructure in which the occupation ratio (Mb/Mt) and the occupation ratio (Ms/Mt) are precisely controlled to 60% or more, respectively, each phase is finely and uniformly dispersed, a phase hardness difference is lowered, a yield ratio is lowered as transformation begins at low stress in the early step of plastic deformation, and a work hardening rate is increased by effectively dispersing strain, and thus a high work hardening rate is obtained. In addition, since such a microstructure change relieves local stress and strain concentration after necking and delays the generation, growth and cohesion of voids causing ductile fracture, steel ductility is improved. As a result, as shown in FIG. 3, a cold-rolled steel sheet with excellent formability, which satisfies a low yield ratio, which is a characteristic of a DP steel, and is greatly improved in work hardening rate and ductility compared with the conventional DP steel, may be manufactured such that, when the occupation ratio (Mb/Mt) and the occupation ratio (Ms/Mt) are controlled to 60% or more, the following Relationship 2 regarding the strain hardening coefficient (n), elongation (El), tensile strength (TS) and yield ratio (YR) may be satisfied.

$$n \times El \times TS/YR \geq 2500 \qquad \text{[Relationship 2]}$$

(where n, El, TS, and YR indicate the strain hardening coefficient (n), elongation (El), tensile strength (TS), and yield ratio (YR), which are measured at a strain of 4 to 6%, respectively).

Meanwhile, on the surface of the cold-rolled steel sheet having the above-described alloy composition and microstructure, a galvanized layer may be formed, or a galvannealed layer formed by galvannealing the galvanized layer may be formed.

Next, methods of manufacturing a cold-rolled steel sheet, a galvanized steel sheet and a galvannealed steel sheet, which have excellent formability, according to another aspect of the present invention will be described in detail.

The method of manufacturing a cold-rolled steel sheet with excellent formability according to another aspect of the present invention comprises obtaining a hot-rolled steel sheet by reheating a slab of the above-described alloy composition and then performing hot rolling, coiling and cooling, obtaining a cold-rolled steel sheet by cold rolling, performing continuous annealing, performing cooling (primary cooling, secondary cooling, maintenance, and tertiary cooling) after the continuous annealing, and then performing skin-pass rolling (temper rolling). In addition, to obtain a galvanized steel sheet or galvannealed steel sheet, after maintaining and before tertiary cooling, galvanizing may be performed, and galvannealing may be performed as needed.

Step of Obtaining Hot-Rolled Steel Sheet

First, a steel slab having the above-described alloy composition is prepared, and reheated under general conditions. The slab reheating is a process for facilitating subsequent hot rolling, and obtaining a desired property of a steel sheet, and in the present invention, there is no particular limitation to the reheating conditions. However, as a non-limiting exemplary embodiment, reheating may be performed in a temperature range from 1100 to 1300° C.

A hot-rolled steel sheet may be obtained by finishing hot rolling of the reheated slab at a temperature of transformation point Ar3 or more under conventional conditions. In the present invention, hot-rolling conditions are not particularly limited and general hot-rolling conditions may be applied. However, as a non-limiting exemplary embodiment, hot rolling may be performed such that a temperature at the finishing mill exit becomes Ar3 to Ar3+50° C., and more preferably, hot rolling may be performed such that a temperature at the finishing mill exit becomes 800 to 1000° C.

After the hot-rolled steel sheet having been subjected to finishing hot rolling is coiled at 400 to 700° C., cooling may be performed by decreasing the temperature from the coiling temperature to room temperature at an average cooling rate of 0.1° C./s or less. Here, the average cooling rate may be defined as the average value of a cooling rate between the coiling temperature and room temperature. As the coiling temperature and the cooling conditions are satisfied, a hot-rolled steel sheet in which a carbide serving a nucleation site of austenite is finely dispersed in a matrix may be manufactured. When a fine carbide which is uniformly dispersed in the hot rolling is formed, austenite is formed through fine dispersion by dissolving the carbide in subsequent continuous annealing, resulting in uniform dispersion of fine martensite after annealing.

Step of Obtaining Cold-Rolled Steel Sheet

The coiled hot-rolled steel sheet is pickled, and then cold rolling is performed at a reduction ratio of 40 to 70%. If the cold-rolling reduction ratio is less than 40%, it is difficult to ensure a desired thickness and correct the shape of the steel sheet. On the other hand, when the cold-rolled reduction ratio is more than 70%, there are a high possibility of cracking at an edge of the steel sheet and a problem of bearing a cold rolling load. Therefore, in the present invention, the cold-rolling reduction ratio is preferably limited to 40 to 70%.

Step of Performing Continuous Annealing

The cold-rolled steel sheet is subjected to continuous annealing at a temperature ranging from Ac1+20° C. to Ac3−20° C. More preferably, continuous annealing may be performed at a temperature ranging from 760 to 820° C. In addition, the continuous annealing may be performed in a continuous galvannealing furnace. The continuous annealing is performed to form ferrite and austenite and distribute carbon as well as inducing recrystallization. When the continuous annealing temperature is less than Ac1+20° C. or less than 760° C., not only desired martensite and bainite fractions may not be ensured after annealing, but also sufficient recrystallization does not occur and it is difficult to form sufficient austenite. On the other hand, when the continuous annealing temperature is more than Ac3−20° C. or 830° C., productivity is reduced, and excessive austenite is formed, thereby greatly increasing bainite and martensite fractions after cooling, increasing yield strength and lowering ductility. As a result, it is difficult to ensure a low yield ratio and high ductility, which is a characteristic of a DP steel. In addition, due to an increased surface concentration of elements such as silicon (Si), manganese (Mn) and boron (B), which reduce the wettability of galvanized product, the quality of a plated surface may be decreased. Considering these facts, in the present invention, the continuous annealing temperature may be limited to a temperature range from Ac1+20° C. to Ac3−20° C., and more preferably, 760 to 820° C.

Step of Performing Cooling

Bainite is introduced by primary cooling the continuous annealed steel sheet from a continuous annealing temperature to a primary finish cooling temperature of 630 to 670° C. at an average cooling rate of 10° C./s or less, and using quenching equipment, secondary cooling from the primary finish cooling temperature to a secondary finish cooling temperature of 400 to 500° C. at an average cooling rate of 5° C./s or more.

The primary cooling is slow cooling performed at an average cooling rate of 10° C./s or less, and the primary finish cooling temperature may range from 630 to 670° C. Here, the primary finish cooling temperature may be defined by the time of initiating quenching by further applying quenching equipment which has not been applied in the primary cooling.

The secondary cooling is quenching performed at an average cooling rate of 5° C./s or more, and the secondary finish cooling temperature may range from 400 to 500° C. The secondary cooling may be performed by further adding quenching equipment which has not been applied in the primary cooling, and preferably, uses hydrogen quenching equipment using $H_2$ gas. Here, it is important to control the secondary finish cooling temperature to be 400 to 500° C. at which bainite is effectively produced, and when the secondary finish cooling temperature is more than 500° C., or less than 400° C., it is difficult to obtain an effective bainite fraction and to obtain a 60% or more occupation ratio of fresh martensite adjacent to bainite, and therefore, a 60% or more occupation ratio of fine fresh martensite having an average particle size of less than 3 μm may not be obtained. As a result, the effects of fresh martensite refinement and uniform dispersion are not exhibited, and thus it is difficult to improve formability as desired.

Afterward, carbon is concentrated in untransformed austenite adjacent to bainite through maintaining at the secondary finish cooling temperature for 70 seconds or more, and then tertiary cooling from a maintaining temperature to (Ms−100° C.) or less is performed at an average cooling rate of 5° C./s or more, and thereby fine fresh martensite may be introduced into an area adjacent to bainite. Here, 'Ms' is martensite start temperature.

In addition, to correct the shape of the steel sheet after the tertiary cooling, skin-pass rolling (temper rolling) at a reduction ratio of less than 1% may be performed.

Step of Performing Galvanizing and Galvannealing

Meanwhile, after maintaining at the secondary finish cooling temperature for 70 seconds or more and before the tertiary cooling, galvanizing step may be performed in a temperature range from 430 to 490° C., thereby forming a galvanized layer on the steel sheet. In addition, a galvannealed layer may be formed by galvannealing as needed.

Hereinafter, the present invention will be described in further detail with reference to examples. However, it should be noted that the following examples are merely provided to embody the present invention, but not to limit the scope of the present invention. This is because the scope of the present invention is determined by the descriptions in the claims and the matters reasonably inferred therefrom.

EXAMPLES

First, a steel slab having an alloy composition (units: wt %) listed in Table 1 below was prepared, and then a cold-rolled steel sheet and a galvanized steel sheet were manufactured according to manufacturing conditions shown in Table 2.

TABLE 1

| Classification | C | Si | Mn | P | S | Sol.Al | Mo | Cr | Ti | Nb | N | B | Sb | Relationship 1 |
|---|---|---|---|---|---|---|---|---|---|---|---|---|---|---|
| Example 1 | 0.089 | 0.42 | 2.3 | 0.02 | 0.003 | 0.03 | 0.12 | 0.85 | 0.025 | 0.025 | 0.005 | 0.0025 | 0.03 | 0.21 |
| Example 2 | 0.081 | 0.39 | 2.35 | 0.02 | 0.003 | 0.02 | 0.1 | 0.79 | 0.021 | 0.002 | 0.006 | 0.001 | 0.02 | 0.20 |
| Example 3 | 0.075 | 0.5 | 2.5 | 0.021 | 0.007 | 0.025 | 0.08 | 0.7 | 0.01 | 0.023 | 0.004 | 0.002 | 0.02 | 0.22 |
| Example 4 | 0.09 | 0.35 | 2.1 | 0.023 | 0.005 | 0.05 | 0.09 | 0.85 | 0.01 | 0.028 | 0.006 | 0.002 | 0.03 | 0.20 |
| Example 5 | 0.07 | 0.62 | 2 | 0.031 | 0.004 | 0.04 | 0.14 | 0.62 | 0.015 | 0.017 | 0.004 | 0.001 | 0.03 | 0.30 |

TABLE 1-continued

| Classification | C | Si | Mn | P | S | Sol.Al | Mo | Cr | Ti | Nb | N | B | Sb | Relationship 1 |
|---|---|---|---|---|---|---|---|---|---|---|---|---|---|---|
| Example 6 | 0.1 | 0.32 | 2.3 | 0.015 | 0.005 | 0.02 | 0.09 | 0.9 | 0.03 | 0.02 | 0.005 | 0.001 | 0.02 | 0.19 |
| Comparative Example 1 | 0.08 | 0.32 | 2.7 | 0.009 | 0.001 | 0.05 | 0.13 | 0.78 | 0.012 | 0.013 | 0.004 | 0.001 | 0.02 | 0.16 |
| Comparative Example 2 | 0.11 | 0.15 | 2.8 | 0.025 | 0.002 | 0.02 | 0.11 | 0.58 | 0.021 | 0.003 | 0.005 | 0 | 0.02 | 0.14 |
| Comparative Example 3 | 0.06 | 0.1 | 2.6 | 0.006 | 0.001 | 0.037 | 0.05 | 0.75 | 0.002 | 0.024 | 0.006 | 0.0001 | 0.02 | 0.08 |
| Comparative Example 4 | 0.09 | 0.3 | 2.5 | 0.016 | 0.001 | 0.032 | 0.1 | 0.9 | 0.002 | 0.004 | 0.004 | 0.0007 | 0.02 | 0.16 |
| Comparative Example 5 | 0.13 | 0.12 | 2.5 | 0.02 | 0.003 | 0.03 | 0.08 | 0.52 | 0.01 | 0.02 | 0.006 | 0.001 | 0.02 | 0.16 |

TABLE 2

| Classification | Finished rolling temperature (° C.) | Coiling temperature (° C.) | Cold-rolling reduction ratio (%) | Continuous annealing temperature (° C.) | Primary cooling | | Secondary cooling | | | Tertiary cooling | | Galvanizing temperature (° C.) |
|---|---|---|---|---|---|---|---|---|---|---|---|---|
| | | | | | Cooling rate (° C./s) | Finish cooling temperature (° C.) | Cooling rate (° C./s) | Finish cooling temperature (° C.) | Maintaining Maintaining time (s) | Cooling rate (° C./s) | Finish cooling temperature (° C.) | |
| Example 1 | 910 | 652 | 52 | 795 | 3.5 | 645 | 16.7 | 440 | 85 | 6.2 | 50 | 455 |
| Example 2 | 915 | 675 | 52 | 815 | 3.9 | 653 | 15.9 | 450 | 86 | 6.3 | 50 | 456 |
| Example 3 | 910 | 672 | 52 | 782 | 3.4 | 657 | 19.0 | 411 | 83 | 6.1 | 51 | 453 |
| Example 4 | 915 | 692 | 52 | 815 | 3.9 | 653 | 13.9 | 475 | 85 | 6.2 | 53 | 456 |
| Example 5 | 902 | 663 | 52 | 785 | 3.2 | 647 | 17.7 | 428 | 86 | 6.7 | 52 | 455 |
| Example 6 | 914 | 675 | 52 | 820 | 4.1 | 661 | 12.1 | 498 | 84 | 6.2 | 51 | 453 |
| Comparative Example 1 | 895 | 652 | 52 | 762 | 3.0 | 651 | 17.5 | 430 | 84 | 6.3 | 53 | 454 |
| Comparative Example 2 | 921 | 656 | 52 | 790 | 3.3 | 648 | 26.3 | 320 | 88 | 6.4 | 52 | 455 |
| Comparative Example 3 | 931 | 647 | 52 | 810 | 3.8 | 652 | 8.0 | 550 | 81 | 6.8 | 51 | 457 |
| Comparative Example 4 | 902 | 635 | 52 | 770 | 3.0 | 651 | 24.7 | 340 | 86 | 6.2 | 49 | 452 |
| Comparative Example 5 | 918 | 673 | 52 | 835 | 4.4 | 652 | 8.8 | 540 | 82 | 6.4 | 48 | 458 |

A mechanical property, a plating property and a microstructure characteristic of each of the steel sheets manufactured as described above were evaluated, and the results are shown in Table 3 below. Here, a tensile test for each specimen was performed in an L direction following ASTM standards to evaluate tensile properties, and particularly, a work hardening rate was measured at a strain of 4 to 6% as specified in VDA (German Automotive Association) standards.

The microstructure fraction was assessed by analyzing a matrix at the position of (¼) thickness of the annealed steel sheet. Specifically, after Nital corrosion, ferrite (F), bainite (B), fresh martensite (Mt, Mb, Ms) and austenite (A) fractions were measured using FE-SEM and an image analyzer.

TABLE 3

| Classification | Mechanical property | | | | | | Phase fraction (%) | | | | | Phase occupation ratio (%) | |
| --- | --- | --- | --- | --- | --- | --- | --- | --- | --- | --- | --- | --- | --- |
| | YS (MPa) | TS (MPa) | EI (%) | YR | n | Relationship 2 (MPa %) | F | B + A | Mt | Mb | Ms | Mb/Mt | Ms/Mt |
| Example 1 | 602 | 1010 | 15 | 0.60 | 0.13 | 3304 | 32 | 22 | 46 | 35 | 38 | 76 | 83 |
| Example 2 | 621 | 1025 | 14 | 0.61 | 0.12 | 2842 | 25 | 23 | 52 | 38 | 36 | 73 | 69 |
| Example 3 | 630 | 1109 | 13 | 0.57 | 0.1 | 2538 | 31 | 27 | 42 | 31 | 35 | 74 | 83 |
| Example 4 | 572 | 1052 | 14 | 0.54 | 0.11 | 2980 | 26 | 23 | 51 | 35 | 34 | 69 | 67 |
| Example 5 | 611 | 1034 | 14 | 0.59 | 0.11 | 2695 | 36 | 19 | 45 | 34 | 41 | 76 | 91 |
| Example 6 | 575 | 998 | 16 | 0.58 | 0.13 | 3603 | 21 | 18 | 61 | 49 | 41 | 80 | 67 |
| Comparative Example 1 | 598 | 1020 | 11 | 0.59 | 0.09 | 1722 | 42 | 18 | 40 | 21 | 23 | 53 | 58 |
| Comparative Example 2 | 712 | 1032 | 11 | 0.69 | 0.07 | 1152 | 32 | 11 | 57 | 26 | 25 | 46 | 44 |
| Comparative Example 3 | 692 | 1042 | 11 | 0.66 | 0.07 | 1208 | 21 | 19 | 60 | 32 | 34 | 53 | 57 |
| Comparative Example 4 | 652 | 995 | 13 | 0.66 | 0.09 | 1777 | 36 | 16 | 48 | 16 | 29 | 33 | 60 |
| Comparative Example 5 | 652 | 1065 | 12 | 0.61 | 0.08 | 1670 | 15 | 22 | 63 | 35 | 21 | 56 | 33 |

As shown in Table 3, in the case of Comparative Examples 1 to 5 in which the alloy composition and manufacturing process conditions were outside of the range of the present invention, or the microstructure fractions and occupation ratios of the steel were out of the range of the present invention, Relationship 2 (n×El×TS/YR) was less than 2500, confirming that desired formability of the steel sheet may not be ensured.

Meanwhile, in the case of Examples 1 to 6 in which their component ranges satisfy the requirements of the present invention, and their microstructures satisfy the range of the present invention, Relationship 2 (n×El×TS/YR) is as high as 2500 or more, confirming that desired formability of a steel sheet may be ensured, and the plating property is also satisfactory.

According to the present invention, as the alloy composition and manufacturing process of a steel sheet are optimized, a cold-rolled steel sheet and a galvanized steel sheet satisfying a low yield ratio, which is a characteristic of a DP steel, and having higher elongation (El) and a higher strain hardening coefficient (n) than the DP steel can be provided.

The cold-rolled steel sheet and the galvanized steel sheet according to the present invention can be used to prevent processing defects such as cracks or wrinkles generated in press forming, and therefore can be variously used in parts for an automotive structure having a complicated shape requiring a great deal of formability, and simultaneously ensure a material quality and a plating property.

The various and advantageous advantages and effects of the present invention are not limited to the above description, and will be more easily understood while exemplary embodiments of the present invention are described.

While the present invention has been described in detail with reference to exemplary embodiments of the present invention, it can be understood by those of ordinary skill in the art that the present invention can be modified and changed into various forms without departing from the idea and scope of the present invention.

What is claimed is:

1. A cold-rolled steel sheet, comprising, by weight percent (wt %), 0.06 to 0.15% of carbon (C), more than 0% and 1.2% or less of silicon (Si), 1.7 to 2.7% of manganese (Mn), more than 0% and 0.15% or less of molybdenum (Mo), more than 0% and 1.0% or less of chromium (Cr), 0.1% or less of phosphorus (P), 0.01% or less of sulfur (S), 0.001 to 0.04% of titanium (Ti), 0.001 to 0.04% of niobium (Nb), 0.01% or less of nitrogen (N), more than 0% and 0.01% or less of boron (B), and a remainder of Fe and unavoidable impurities, wherein contents of the Si, the C, the Mn, the Mo and the Cr at a position of (¼) thickness of the cold-rolled steel sheet satisfy the following Relationship 1:

$$([Si]+[C]\times 3)/([Mn]+[Mo]+[Cr])>0.18$$

wherein [Si], [C], [Mn], [Mo] and [Cr] indicate contents, in weight percent, of Si, C, Mn, Mo, and Cr, respectively, wherein the cold-rolled steel sheet includes: a microstructure consisting of, in area percent, 10 to 70% of a ferrite phase, 10 to 50% of a bainite phase and a retained austenite phase, and a remainder of a fresh martensite phase, and a ratio (Mb/Mt) of a fresh martensite phase (Mb) adjacent to the bainite phase to a total fresh martensite phase (Mt) is 60% or more.

2. A cold-rolled steel sheet, comprising, by weight percent (wt %), 0.06 to 0.15% of carbon (C), more than 0% and 1.2% or less of silicon (Si), 1.7 to 2.7% of manganese (Mn), more than 0% and 0.15% or less of molybdenum (Mo), more than 0% and 1.0% or less of chromium (Cr), 0.1% or less of phosphorus (P), 0.01% or less of sulfur (S), 0.001 to 0.04% of titanium (Ti), 0.001 to 0.04% of niobium (Nb), 0.01% or less of nitrogen (N), more than 0% and 0.01% or less of boron (B), and a remainder of Fe and unavoidable impurities, wherein contents of the Si, the C, the Mn, the Mo and the Cr at a position of (¼) thickness of the cold-rolled steel sheet satisfy the following Relationship 1:

$$([Si]+[C]\times 3)/([Mn]+[Mo]+[Cr])>0.18 \quad \text{Relationship 1:}$$

where [Si], [C], [Mn], [Mo] and [Cr] indicate contents, in weight percent, of Si, C, Mn, Mo, and Cr, respectively, wherein the cold-rolled steel sheet includes: a microstructure consisting of, in area percent, 10 to 70% of a ferrite phase, 10 to 50% of a bainite phase and a retained austenite phase, and a remainder of a fresh martensite phase, and a ratio (Ms/Mt) of a fresh martensite phase (Ms) having an average particle size of 3 μm or less to a total fresh martensite phase (Mt) is 60% or more.

3. A cold-rolled steel sheet, comprising, by weight percent (wt %), 0.06 to 0.15% of carbon (C), more than 0% and 1.2% or less of silicon (Si), 1.7 to 2.7% of manganese (Mn), more than 0% and 0.15% or less of molybdenum (Mo), more than 0% and 1.0% or less of chromium (Cr), 0.1% or less of phosphorus (P), 0.01% or less of sulfur (S), 0.001 to 0.04% of titanium (Ti), 0.001 to 0.04% of niobium (Nb), 0.01% or less of nitrogen (N), more than 0% and 0.01% or less of boron (B), more than 0% and 1.0% or less of aluminum (sol. Al), more than 0% and 0.05% or less of antimony (Sb), and a remainder of Fe and unavoidable impurities, wherein contents of the Si, the C, the Mn, the Mo and the Cr at a position of (¼) thickness of the cold-rolled steel sheet satisfy the following Relationship 1:

$$([Si]+[C]\times 3)/([Mn]+[Mo]+[Cr])>0.18$$

where [Si], [C], [Mn], [Mo] and [Cr] indicate contents of Si, C, Mn, Mo, and Cr, respectively, wherein the cold-rolled steel sheet includes: a microstructure consisting of, in area percent, 10 to 70% of a ferrite phase, 10 to 50% of a bainite phase and a retained austenite phase, and a remainder of a fresh martensite phase, and a ratio (Mb/Mt) of a fresh martensite phase (Mb) adjacent to the bainite phase to a total fresh martensite phase (Mt) is 60% or more, and wherein a strain hardening coefficient (n), elongation (El), tensile strength (TS), and a yield ratio (YR), each measured at a strain of 4 to 6%, satisfy the following Relationship 2:

$$n \times El \times TS/YR \geq 2500.$$

4. The cold-rolled steel sheet according to claim 1, further comprising, by wt %, more than 0% and 1.0% or less of aluminum (sol. Al), and more than 0% and 0.05% or less of antimony (Sb).

5. The cold-rolled steel sheet according to claim 1, wherein a ratio (Ms/Mt) of a fresh martensite phase (Ms) having an average particle size of 3 μm or less to the total fresh martensite phase (Mt) is 60% or more.

6. The cold-rolled steel sheet according to claim 1, wherein a strain hardening coefficient (n), elongation (El), tensile strength (TS), and a yield ratio (YR), each measured at a strain of 4 to 6%, satisfy the following Relationship 2:

$$n \times El \times TS/YR \geq 2500.$$

7. A galvanized steel sheet comprising: the cold-rolled steel sheet of claim 1; and a galvanized layer formed on a surface of the cold-rolled steel sheet.

8. The cold-rolled steel sheet according to claim 2, further comprising, by wt %, more than 0% and 1.0% or less of aluminum (sol. Al), and more than 0% and 0.05% or less of antimony (Sb).

9. The cold-rolled steel sheet according to claim 2, wherein a strain hardening coefficient (n), elongation (El), tensile strength (TS), and a yield ratio (YR), each measured at a strain of 4 to 6%, satisfy the following Relationship 2:

$$n \times El \times TS/YR \geq 2500.$$

10. A galvanized steel sheet comprising: the cold-rolled steel sheet of claim 4; and a galvanized layer formed on a surface of the cold-rolled steel sheet.

11. The cold-rolled steel sheet according to claim 3, wherein the fresh martensite phase (Mb) has an average particle size of 3 μm or less.

12. The galvanized steel sheet according to claim 7, wherein the galvanized layer includes: an alloyed galvanized layer.

13. The galvanized steel sheet according to claim 10, wherein the galvanized layer includes: an alloyed galvanized layer.

* * * * *